(12) United States Patent
Hyslop et al.

(10) Patent No.: US 8,176,181 B2
(45) Date of Patent: May 8, 2012

(54) LAYER-2 MANAGEMENT ENTITY MESSAGING FRAMEWORK IN A NETWORK

(75) Inventors: Bradley Thomas Hyslop, La Jolla, CA (US); Robert L. Hare, Jr., San Diego, CA (US); Inderjit Singh, Ocean Beach, CA (US); Shlomo Ovadia, San Diego, CA (US); Ronald Lee, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 742 days.

(21) Appl. No.: 12/027,216

(22) Filed: Feb. 6, 2008

(65) Prior Publication Data

US 2008/0189431 A1 Aug. 7, 2008

Related U.S. Application Data

(60) Provisional application No. 60/900,206, filed on Feb. 6, 2007, provisional application No. 60/901,564, filed on Feb. 14, 2007, provisional application No. 60/927,613, filed on May 4, 2007, provisional application No. 60/901,563, filed on Feb. 14, 2007, provisional application No. 60/927,766, filed on May 4, 2007, provisional application No. 60/927,636, filed on May 4, 2007, provisional application No. 60/931,314, filed on May 21, 2007.

(51) Int. Cl.
*G06F 15/173* (2006.01)
*G06F 15/177* (2006.01)
*G06F 13/22* (2006.01)
(52) U.S. Cl. .......................... 709/226; 709/228; 710/220
(58) Field of Classification Search .................. 709/226, 709/228; 710/220
See application file for complete search history.

(56) References Cited

U.S. PATENT DOCUMENTS

| | | | |
|---|---|---|---|
| 6,717,913 | B1 | 4/2004 | Ghahremani et al. |
| 2002/0029271 | A1 | 3/2002 | Schwager |
| 2002/0035442 | A1 | 3/2002 | Dervisoglu et al. |
| 2002/0080816 | A1 | 6/2002 | Spinar et al. |
| 2003/0005130 | A1 | 1/2003 | Cheng |

(Continued)

FOREIGN PATENT DOCUMENTS

CN 1356012 A 6/2002

(Continued)

OTHER PUBLICATIONS

IEEE revision with Corrections, Clarifications & Enhancements, P802.11-REVma/D9.0 Oct. 2006, pp. 319-320.

(Continued)

*Primary Examiner* — Larry Donaghue
(74) *Attorney, Agent, or Firm* — Bruce W. Greenhaus; James Y. C. Sze

(57) ABSTRACT

A communications system and method comprises the steps of performing at least one Layer 2 transaction comprising a plurality of wave cycles, each Layer 2 transaction including performing a first wave cycle, concatenating the received first responses from each of the one or more nodes, and performing a second wave cycle. The first wave cycle includes broadcasting a first request from a network coordinator to a plurality of nodes connected to a coordinated network, and receiving a first response from one or more of the nodes indicating that the nodes have opted to participate in a next subsequent wave cycle. The second wave cycle includes transmitting a subsequent request from the network coordinator to each of the one or more nodes based upon the concatenated first responses.

25 Claims, 4 Drawing Sheets

U.S. PATENT DOCUMENTS

| | | | |
|---|---|---|---|
| 2003/0072264 A1 | 4/2003 | Mo et al. | |
| 2005/0152370 A1* | 7/2005 | Meehan et al. | 370/393 |
| 2005/0254503 A1* | 11/2005 | Claseman | 370/395.41 |
| 2006/0280197 A1 | 12/2006 | Stone | |
| 2007/0058646 A1* | 3/2007 | Hermoni | 370/401 |
| 2007/0168486 A1* | 7/2007 | McCoy et al. | 709/223 |

FOREIGN PATENT DOCUMENTS

| | | |
|---|---|---|
| CN | 1520659A A1 | 8/2004 |
| EP | 0971509 A1 | 1/2000 |
| EP | 1 225 785 A1 | 7/2002 |
| EP | 1601144 A | 2/2005 |
| GB | 2406481 A | 3/2005 |
| WO | 00/72626 A1 | 11/2000 |
| WO | WO 00/72626 A | 11/2000 |
| WO | WO 01/82550 A | 11/2001 |
| WO | WO03/003658 A1 | 1/2003 |

OTHER PUBLICATIONS

PCT/US2008/053222 International Search Report (Filed Jun. 2, 2008). EP Search Authority.

PCT/US2008/053212 International Search Report (Filed Jun. 2, 2008). EP Search Authority.

International Search Report and Written Opinion mailed Dec. 15, 2008 from International Application No. PCT/US2008/053202.

Hwang, Won-Joo et al. "HomeMAC: QoS-based MAC Protocol for the Home Network", Proceedings of the Seventh International Symposium on Computers and Communications (ISCC '02).

Official Action issued May 25, 2011 in counterpart CN Application No. 200880007920.9.

Communication "First Office Action" issued Jun. 23, 2011 in counterpart CN Application No. 200880007820.6.

\* cited by examiner

LAYER-2 MANAGEMENT ENTITY MESSAGING FRAMEWORK IN A NETWORK

CLAIM OF PRIORITY

This application claims priority to U.S. Provisional Application 60/900,206 filed Feb. 6, 2007, U.S. Provisional Application 60/901,564 filed Feb. 14, 2007, U.S. Provisional Application 60/927,613 filed May 4, 2007, U.S. Provisional Application 60/901,563 filed Feb. 14, 2007, U.S. Provisional Application 60/927,766 filed May 4, 2007, U.S. Provisional Application 60/927,636 filed May 4, 2007, and U.S. Provisional Application 60/931,314 filed May 21, 2007, each of which is herein incorporated by reference.

FIELD OF THE DISCLOSURE

The disclosed method and apparatus relate to communication protocols for a shared medium, and more specifically, it relates to a Layer 2 messaging framework and architecture.

BACKGROUND

In addition to computers, home networks now typically include multiple types of subscriber equipment configured to deliver subscriber services through the home network. The subscriber services include the delivering of multimedia, such as streaming audio and video, through the home network to the subscriber equipment where it is presented to a user. As the number of available subscriber services increases, so does the number of devices being connected to a home network. The increase in the number of services and devices increases the complexity of the coordination between the network nodes as each node may be produced by a different manufacturer at different times. Some home networking technologies have emerged in an attempt to facilitate simple home network solutions and take advantage of existing network infrastructure that may be present in a number of homes. For example, the Home Phone Network Alliance (HPNA) allows users to network home computers by using the existing telephone and coaxial cable wiring within a home. HPNA-enabled devices utilize a different frequency spectrum than the spectrum used by faxes and phones. Instead of using existing telephone and coaxial wiring, the Homeplug® Power Alliance utilizes the existing electrical power wiring in a home to create a home network. In a Homeplug® network, all Homeplug®-enabled devices that are plugged into a wall outlet connected to a common electrical circuit may be wired together in a home network. One issue with Homeplug® is that the network bandwidth is susceptible to significant reduction due to large variations of the home electrical wiring and reactive loads in the outlets.

Additionally, problems arise in implementing network devices that correctly interact with other network devices. These problems may inhibit the deployment of newer devices that provide later-developed services in the presence of older (legacy) devices. The emerging Multimedia over Coax Alliance (MoCA) standard architecture impacts this problem in that (1) network behaviors dynamically assign a device the "Network Coordinator" (NC) role in order to optimize performance, (2) only the device in the NC role is known to be able to schedule traffic for all other nodes in the network, and (3) a full mesh network architecture may be formed between any device and its peers.

With many potential applications sharing the same digital network, various applications have to compete for a limited amount of bandwidth, which compounds the distribution problem. A bandwidth intensive application, such as a high-throughput download, may cause the degradation of other more important applications sharing the network. This outcome may be unacceptable when the other application requires a high quality of service.

Various solutions to solve this problem have been proposed, usually involving a high-level network controller or having high-level applications setting priority to data packets or data streams within the network. Moreover, intelligent network devices require high computational power, and are consequently more expensive than they need to be. Finally, complex network devices are impractical for home use, as most consumers do not have the sophistication or experience to configure a computer network.

SUMMARY OF THE DISCLOSURE

In one embodiment, a communications method comprises the steps of (1) performing at least one Layer 2 transaction comprising a plurality of wave cycles, each Layer 2 transaction includes performing a first wave cycle, (2) concatenating the received first responses from each of the one or more nodes, and (3) performing a second wave cycle. The first wave cycle includes broadcasting a first request from a network coordinator to a plurality of nodes connected to a coordinated network, and receiving a first response from one or more of the nodes indicating that the nodes have opted to participate in a next subsequent wave cycle. The second wave cycle includes transmitting a subsequent request from the network coordinator to each of the one or more nodes based upon the concatenated first responses.

In another embodiment, a system comprises a physical interface connected to a shared medium and an L2ME connected to the physical interface. The physical interface is configured to transmit and receive signals through the shared medium. The L2ME is configured to manage a plurality of transactions with at least one node connected to the shared medium and includes a lower module and an upper module. The lower module of the L2ME is configured to perform a plurality of wave cycles, and the upper module is configured to facilitate the plurality of transactions using the plurality of wave cycles performed by the lower module.

OVERVIEW

Figure 1:
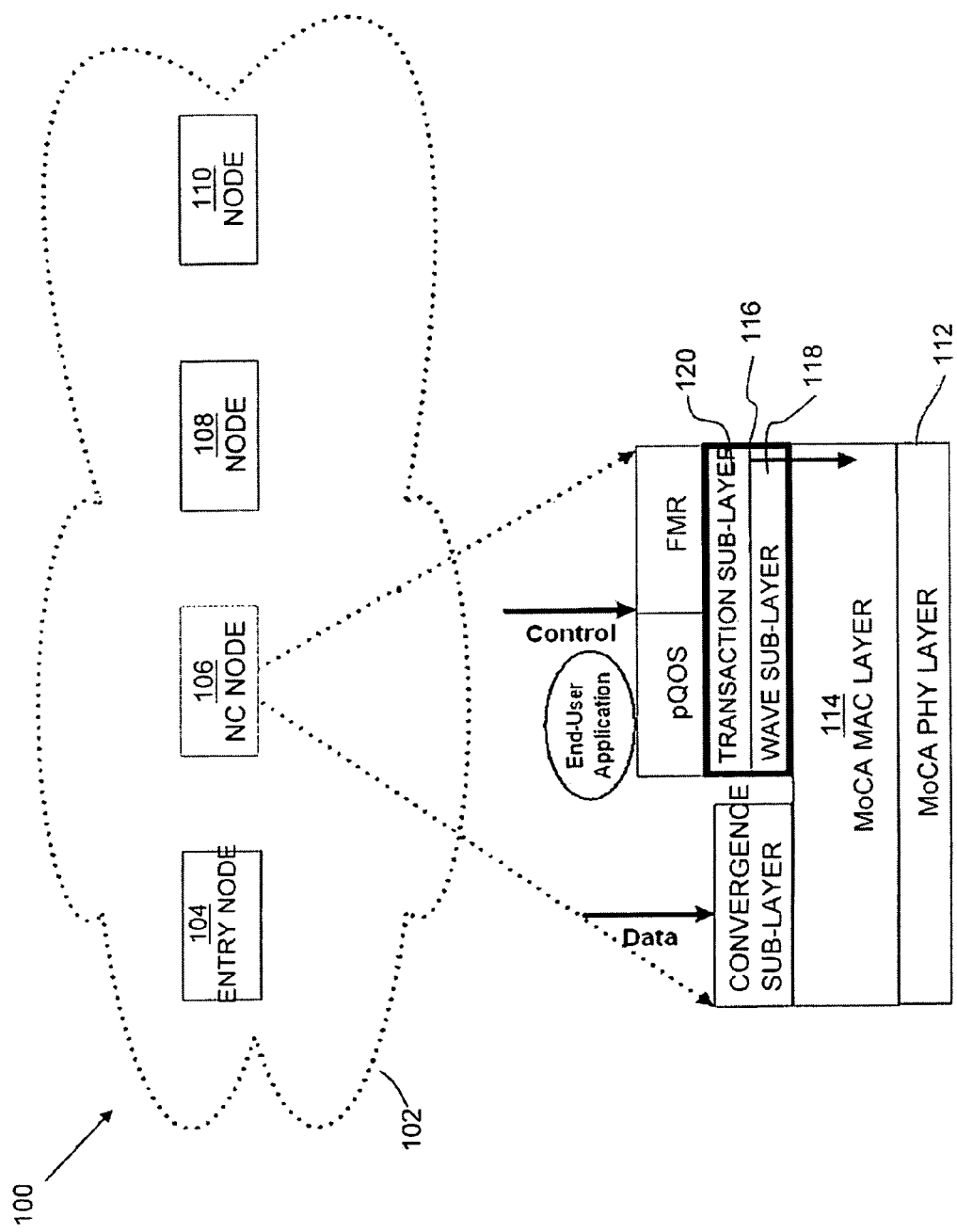
FIG. 1 illustrates a network architecture according to one embodiment.

One system 100 as disclosed herein and shown in FIG. 1 and described in more detail below, comprises a physical layer 112, such as a Multimedia over Coax Alliance (MoCA) PHY Layer, connected to a coordinated network 102. Physical layer 112 is configured to transmit and receive signals through the coordinated network 102. The system further includes an L2ME 116 connected to the physical interface 112 and configured to manage a plurality of transactions with at least one node 104, 108, 110 connected to the coordinated network 102. The L2ME 116 includes a lower module 118, such as an L2ME wave layer, configured to perform a plurality of wave cycles, and an upper module 120, such as an L2ME transaction layer, configured to facilitate the plurality of transactions using the plurality of wave cycles performed by the lower module 118.

One communication method comprises performing at least one Layer 2 transaction comprising a plurality of wave cycles 214, 216. Each Layer 2 transaction includes performing a first wave cycle 214, concatenating the received first responses from each of the one or more nodes 202, 204, 208, 210, 212, and performing a second wave cycle 216. The first wave cycle 214 comprises broadcasting a first request from a network coordinator 206 to a plurality of nodes 202, 204, 208, 210, 212 connected to a coordinated network, and receiving a first response from one or more of the nodes 202, 204, 208, 210, 212 indicating that the nodes have opted to participate in a next subsequent wave cycle. The second wave cycle 216 includes transmitting a subsequent request from the network coordinator 206 to each of the one or more nodes 202, 204, 208, 210, 212 based upon the concatenated first responses.

In some embodiments, the second wave cycle 216 further includes receiving a subsequent response from each participating node 202, 204, 208, 210, 212.

In some embodiments, the step of performing at least one Layer 2 transaction is performed in response to receiving an initial request by the network coordinator 206 from an entry node.

In some embodiments, the first response receiving step comprises receiving the first response from a first sub-set of the plurality of nodes 202, 204, 208, 210, 212 that have opted to participate in the next wave cycle, the method further comprises the step of receiving a second response from a second sub-set of nodes. The second response indicates that the second sub-set of nodes has opted not to participate in the next wave cycle.

In some embodiments, the communication method includes performing a third wave cycle. The third wave cycle includes the network coordinator 206 transmitting a unicast message to at least one of the one or more nodes 202, 204, 208, 210, 212 from which a response was not received by the network coordinator 206 during the first wave cycle 214.

In some embodiments, the third wave cycle further includes receiving a response to the unicast message from the at least one of the one or more nodes, 202, 204, 208, 210, 212.

DETAILED DESCRIPTION

The embodiments relate in general to a system, method and architecture to support a low-level messaging framework in a network. Some embodiments facilitate Layer 2 Management Entity (L2ME) messaging to enable low-cost and high-speed management of resources within the network in order to secure the capability to distribute multimedia data (such as video/audio, games, images, and other interactive services) within existing in-home networks.

The embodiments facilitate making home networking devices simple so that they are easy to use and are cost-effective. In other words, home networks should be simple to configure so home users do not have to deal with complex configuration menus or require advanced knowledge of computer networks. The embodiments also resolve configuration and cost issues through the implementation of a low-level digital transport framework that does not require high amounts of computing power. This low-level framework may be thought of as an extension to the Media Access Control (MAC) sub-layer or the physical (PHY) network layer and is referred to as a "Layer 2 messaging framework."

Layer 2 messaging may be implemented in a variety of networks where a spectrum is shared and negotiated due to the introduction or removal of nodes, as well as the evolution of network signaling capacity. In some embodiments, the network is a coordinated network having a Network Coordinator (NC) that coordinates the communication between the several devices connected to the network. Coordination is achieved by the NC allocating time-slots to network devices during which these devices may transmit or receive MAC messages, probes and data. The network devices connected to the coordinated network may include managed and unmanaged devices. Examples of such networks include coaxial networks in accordance with the Multimedia over Coax Alliance (MoCA) standard, wired networks on "twisted-pair" wire, or wireless home networks. Embodiments are described as being implemented with eight or 16 nodes within the network. However, other embodiments may incorporate extensions to enable any number of nodes within a variety of networks. Additionally, embodiments may include systems, methods, and devices that include Layer 2 messaging architecture and protocols to support end-user applications and vendor-specific services.

Embodiments will now be described with reference to a Layer 2 Management Entity architecture and messaging protocol for a digital network. Some embodiments support application layer-triggered transactions, such as but not limited to, a Universal Plug and Play Quality of Service, and IEEE Stream Reservation Protocol (SRP). Layer 2 messaging protocols may enable capabilities such as parameterized Quality of Service (pQoS) or Full Mesh Rate transactions within the network. Note that the interfaces between the Layer 2 Management Entity and an application layer may vary.

FIG. 1 illustrates a coordinated mesh network architecture 100 with multiple network nodes 104, 106, 108, 110 connected to a network 102. Network node 106 is the NC node and is shown to be configured with PHY layer 112, MAC sub-layer 114, and an L2ME 116. Note that any network node may have multiple physical interfaces and may implement upper-layer functionality (e.g., TCP/IP, UDP, or the like). Network node 104 is an Entry node (EN). Each of nodes 104, 108, and 110 may also be configured with an L2ME 116.

L2ME 116 provides Layer 2 interfaces and management services through which Layer 2 management functions can be invoked. Based on end-user application initiated transactions, L2ME 116 is responsible for executing and managing all L2ME transactions, such as parameterized Quality of Service and Full Mesh Rate, between network nodes 104, 106, 108, and 110. L2ME 116 includes two sub-layers: an upper Transaction Protocol sub-layer 120 and a lower Wave Protocol sub-layer 118. The L2ME Wave Protocol sub-layer 118 is a high-reliability message mechanism in L2ME 116 configured with its own messaging protocol. The L2ME Wave Protocol enables a network node to participate in robust, network-wide, low-latency generic transactions and enables NC node 106 to manage the flow of low-cost audio/video bridging devices, such as devices in accordance with the IEEE 802.1Qat/D0.8 draft standard (July, 2007), across a home network with multiple Layer 2 Quality of Service segments.

L2ME Wave Protocol

The L2ME Wave Protocol provides reliable transport service for L2ME Transaction Protocol by generating multiple Wave Cycles. A Wave Cycle starts when NC node 106 broadcasts a particular payload, such as a Request, to all nodes 104, 108, 110 connected to the network 102. In one embodiment, the NC node 106 first classifies all the nodes in the WAVE_NODEMASK field, described in greater detail below, into three categories before initiating the Wave Cycle. The first category of nodes ("Category 1 nodes") includes network nodes that have yet to be specified in the CYCLE_NODEMASK field of a Request L2ME Frame issued by the NC node 106. The second category of nodes ("Category 2 nodes") includes network nodes that have been identified in the CYCLE_NODEMASK field in a Request L2ME Frame issued by NC node 106, but from which NC node 106 has yet to receive a Response. The third category of network nodes ("Category 3 nodes") includes the network nodes from which NC node 106 has received a Response L2ME Frame.

After NC node 106 has appropriately categorized each of the network nodes 104, 108, 110 as Category 1, 2, or 3 nodes, NC node 106 constructs the CYCLE NODEMASK in accordance with the following guidelines. First, if there are three or more Category 1 nodes, then NC node 106 sets a corresponding number of bits to "1" in the CYCLE_NODEMASK. However, if there are three or more Category 1 nodes, the number of bits set by NC node 106 in the CYCLE_NODEMASK may be less than the total number of Category 1 nodes, but not less than three bits. For example, if there are five Category 1 nodes, NC node 106 may set three, four, or five bits to "1" in the CYCLE_NODEMASK. Second, if there are three or more Category 2 nodes, NC node 106 sets three or more of the bits in the CYCLE_NODEMASK to "1", which correspond to the Category 2 nodes. Third, if there are no Category 1 nodes, or if all of the bits corresponding to Category 1 nodes have already been set to "1" in the CYCLE_NODEMASK, then NC node 106 sets the bits corresponding to Category 2 nodes in the CYCLE_NODEMASK to "1". Finally, NC node 106 may set as many bits to "1" in the CYCLE_NODEMASK as NC node 106 may receive a Response from without disrupting network services. Once the CYCLE_NODEMASK has been generated, NC node 106 initiates the Wave Cycle by broadcasting an L2ME message that includes the CYCLE_NODEMASK.

A Wave Cycle is completed when either NC node 106 receives a corresponding payload, such as a Response, from some or all of the client nodes 104, 108, 110, or the NC node's timer expires. For example, NC node 106 transmits a message and then starts its timer. If the timer of NC node 106 reaches T21 (e.g., 20 milliseconds) before receiving a responsive message from some or all of the network nodes identified in the CYCLE_NODEMASK, then the Wave Cycle is completed even though NC node 106 has not received a responsive message. Note that T21 is the maximum allowable time interval between the transmission of a Request L2ME Frame by NC node 106 and the transmission of a corresponding Response L2ME Frame by the requested node. An L2ME Wave Cycle is successfully completed when each of the nodes identified in the WAVE_NODEMASK field of the payload have responded. Put another way, a Wave Cycle is successful if all of the network nodes 104, 108, 110 are classified as Category 3 nodes before the timer of NC node 106 reaches T21. Alternatively, a Wave Cycle is unsuccessful, or fails, if NC node 106 does not receive a Response L2ME Frame from a Category 2 node that had its corresponding bit set to "1" in the CYCLE_NODEMASK transmitted by NC node 106. If the Wave Cycle fails, then NC node 106 repeats the Wave Cycle by sending a multicast message to only those nodes from which NC node 106 did not receive a Response L2ME Frame. Note that in one embodiment multicast messages are treated the same as broadcast messages with respect to repeating the Wave Cycle by sending a multicast message to the nodes that do not respond. NC node 106 will complete the scheduled Wave Cycles before creating a new Wave Cycle for any node from which a Response was not received.

Figure 2:
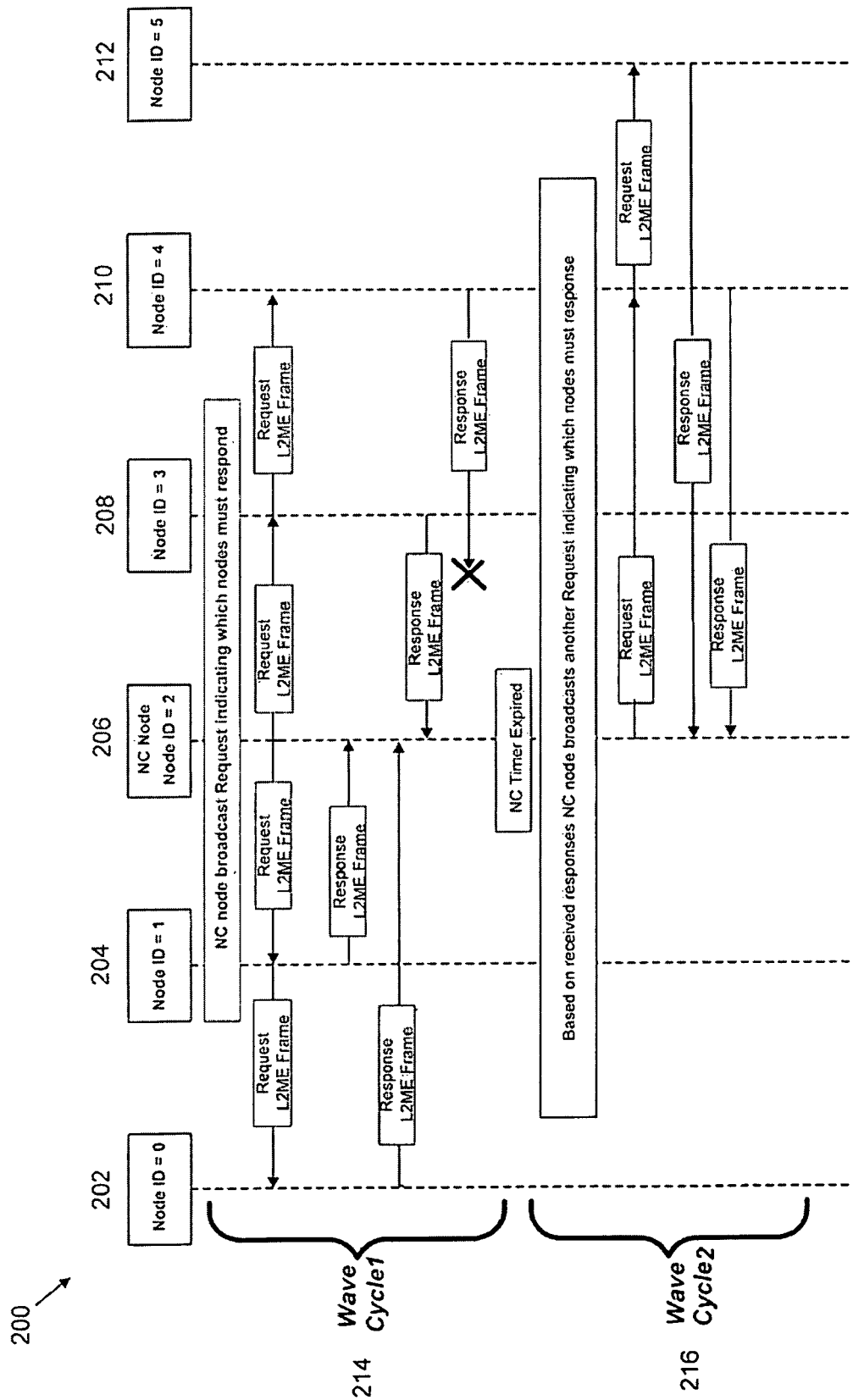
FIG. 2 is a diagram showing two L2ME wave cycles in accordance with the embodiment of FIG. 1.

FIG. 2 is an example of an L2ME wave diagram 200 showing two Wave Cycles 214, 216. A first Wave Cycle 214 is initiated when NC node 206, with node ID=2, broadcasts a message having a payload to all nodes 202, 204, 208, 210, 212 connected to the network. In this example, the payload includes the NODE_BITMASK 011011, where the rightmost bit corresponds to the node with node ID=0. This bitmask indicates that NC node 206 expects to receive a payload containing a WAVE_ACK from client nodes 202, 204, 208, and 210. According to FIG. 2, NC node 206 only receives a Response L2ME Frame from nodes 202, 204, and 208. The Response L2ME Frame from node 210 is either lost or not received before the NC node 206 timer expires. The expiration of the timer in NC node 206 completes the first Wave Cycle 214, but does not finish the transaction.

Since NC node 206 has not received a Response L2ME Frame from node 210, NC node 206 sends another Request L2ME Frame to node 210, thereby initiating a second Wave Cycle 216. The Request sent to node 210 is also sent to node 212 and includes the NODE_BITMASK 110000 requesting nodes 210 and 212 to send a WAVE_ACK to NC node 206. The Response L2ME Frames from nodes 210 and 212 are subsequently received by the NC node 206, thereby completing Wave Cycle 216.

L2ME Transaction Protocol

The L2ME Transaction Protocol is an upper sub-layer protocol in the L2ME that uses multiple L2ME Waves to achieve network-wide transactions. In general, all the L2ME transactions comprise j+1 Waves (where j=0, 1, 2 . . . ) and are started by either an EN or the NC node. An EN may be any network node, including the NC node, which initiates an L2ME transaction based on an end-user application. In the final L2ME Wave, the requested results are returned to the EN by the NC node. The L2ME transaction is completed when the other nodes, such as client nodes, provide their final responses. In some embodiments, only one L2ME transaction is carried out or pending at any given time within the network. For a failed L2ME Wave, the resultant NC node action depends on the specific L2ME transaction type and the Wave number.

Figure 3:
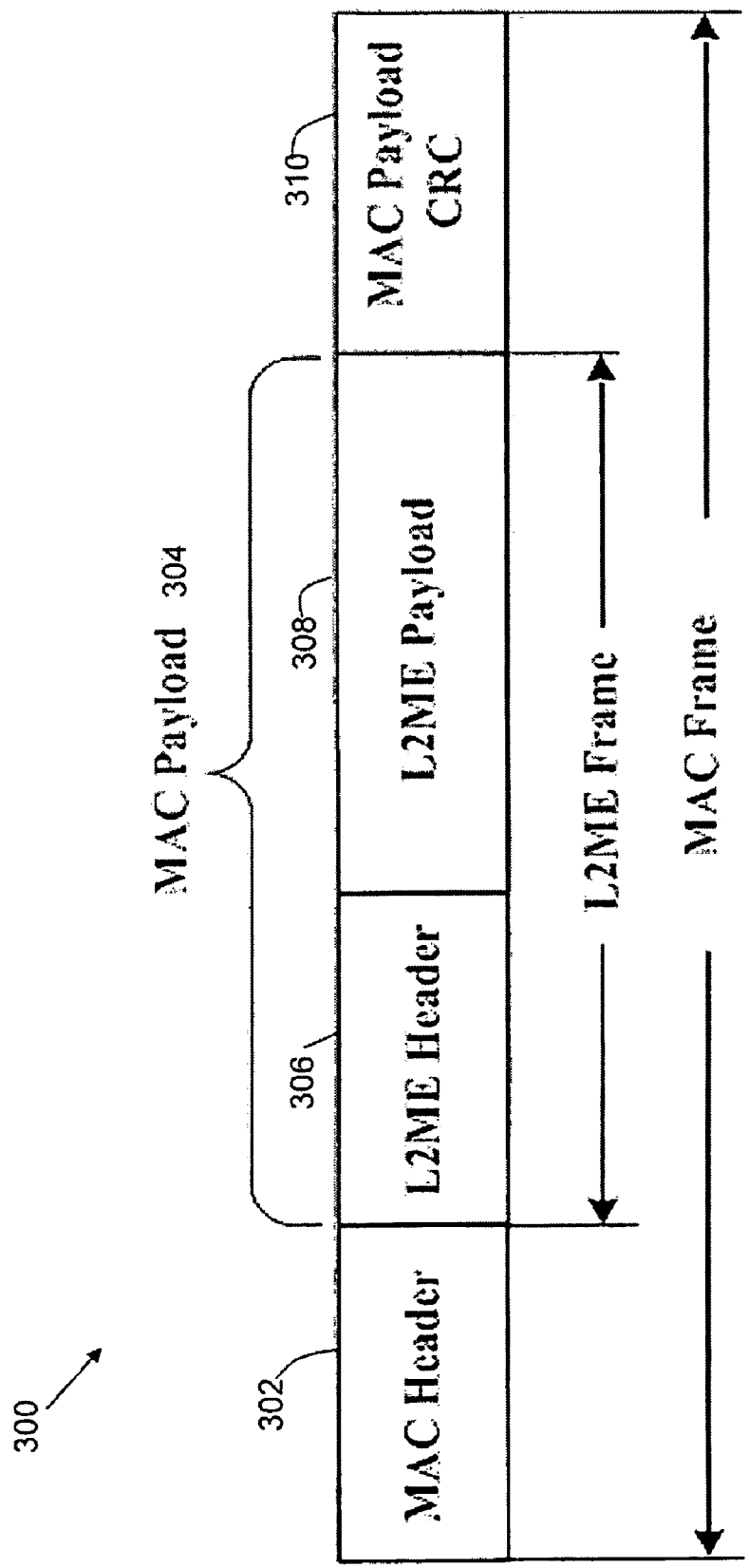
FIG. 3 illustrates a block diagram of an L2ME frame in accordance with the embodiment of FIG. 1.

In general, all L2ME transaction messages may be classified into three different categories during a transaction. The messages are classified as follows: (1) Submit; (2) Request; and (3) Response. Nodes that do not use L2ME messages, such as legacy nodes not configured with an L2ME, may simply drop these messages. A node not configured with an L2ME may receive an L2ME message because the L2ME messages are embedded within the preexisting MAC messaging framework. FIG. 3 illustrates one example of a MAC frame 300 in accordance with one embodiment. MAC frame 300 includes a MAC header 302, a MAC payload 304, and a MAC payload cyclic redundancy check (CRC) 310. L2ME frames are embedded within the MAC payload 304 and include an L2ME header 306, and an L2ME payload 308.

Submit L2ME Messages

The Submit L2ME messages carry application-initiated requests from an EN to the NC node where an L2ME Wave transaction may be initiated. An EN is usually responsible for managing the various stages of a transaction while the NC node is responsible for broadcasting the Request, gathering the Response of each client node, and providing the transaction results to the EN that transmitted the Submit message.

Table 1 below illustrates one example of a Submit L2ME Frame format, which includes a Submit L2ME Frame header and payload.

TABLE 1

Submit L2ME Message Format

| Field | Length | Usage |
|---|---|---|
| Submit L2ME Header | | |
| HDR_FMT | 8 bits | 0x8 |
| ENTRY_NODE_ID | 8 bits | The ID of the node sending this message. |
| ENTRY_INDEX | 8 bits | An Entry node provided value; MAY be used by Entry node to track responses to this Submit message |
| RESERVED | 8 bits | 0x0; Type III |
| VENDOR_ID | 16 bits | |
| TRANS_TYPE | 8 bits | Type of L2ME transaction defined for VENDOR_ID=0; All other values are reserved<br>If VENDOR_ID=0<br>    0x1=pQoS transactions<br>    0x2=FMR<br>The use of this field for other values of VENDOR_ID is vendor specific |
| TRANS_SUBTYPE | 8 bits | Subtype of L2ME transaction defined for a VENDOR_ID and TRANS_TYPE; all values are reserved except for<br>If VENDOR_ID=0<br>    If TRANS_TYPE=0x1<br>        0x1=CREATE<br>        0x2=UPDATE<br>        0x3=DELETE<br>        0x4=LIST<br>        0x5=QUERY<br>        0x6=MAINTENANCE<br>    If TRANS_TYPE=2<br>        0x1=FMR transaction<br>The use of this field for other values of VENDOR_ID is vendor specific |
| WAVE0_NODEMASK | 32 bits | Nodemask specifying nodes that are part of the L2ME Wave 0 |
| RESERVED | 32 bits | 0x0; Type III |
| RESERVED | 8 bits | 0x0; Type III |
| MSG_PRIORITY | 8 bits | Allowed values: 0xFF where 0xFF is the highest priority; NC node MAY process received Submit messages based on MSG_PRIORITY field value |
| TXN_LAST_WAVE_NUM | 8 bits | Allowed values 0x00-0x04; value=the [total number of Waves −1] in an error free transaction |
| RESERVED | 8 bits | 0x0; Type III |
| L2ME Transaction Payload | | |
| L2ME_PAYLOAD | 0-N bytes | L2ME payload is L2ME Wave and transaction specific |

The Submit L2ME Frame header includes an 8-bit ENTRY_TXN_ID field. The ENTRY_TXN_ID field is the Entry Node's transaction ID, which starts at "1" and is incremented each time a Submit message is sent to the NC node. The EN_TXN_ID=0 value is reserved for the NC node when there is no EN. Any L2ME transaction that results from a Submit message may contain this transaction ID. Note that a combination of the Entry node ID with the transaction ID uniquely identifies each L2ME transaction in the network allowing an EN to know that its transaction has been triggered. Additionally, uniquely identifying each transaction allows the EN to recognize and cancel any attempt by the NC node to start a transaction if the EN has already timed out waiting for the transaction to begin. The composition and length of the L2ME_PAYLOAD field depends on the specific VENDOR_ID, TRANS_TYPE, and TRANS_SUBTYPE fields. The VENDOR_ID is a 16-bit field in the Submit and Request L2ME messages that indicates a vendor-specific use of various fields of the messages. For example, the assigned VENDOR_ID range for Entropic Communications is 0x0010 to 0x001F, and the values 0x0000 to 0x000F are assigned to MoCA. The length of the L2ME_PAYLOAD field may be shorter or equal to L_SUB_MAX. Also note that Submit and Request messages associated with a given L2ME transaction may have an identical set of VENDOR_ID, TRANS_TYPE, and TRANS_SUBTYPE fields.

Request L2ME Messages

Request L2ME Frame messages are broadcast to all nodes by the NC node during a transaction Wave. In one embodiment in which a Submit message has been received by the NC node, the NC node will broadcast a Request L2ME Frame message as a consequence of the Submit message. In some cases, when an NC node is acting as the EN as described below, no Submit message is transmitted, and the NC node initiates the transaction by issuing the Request L2ME Frame message on its own behalf. For example, when the NC node initiates a management transaction, a Submit L2ME Frame is not needed, and the transaction begins with the Request L2ME Frame. Each client node receiving a Request L2ME Frame message is expected to respond to the NC node with results of the operation as requested by the NC node in the payload. Table 2 shows the Request L2ME Frame message header and payload format, which is similar to the Submit L2ME Frame format where the MAC header is not shown.

TABLE 2

Request L2ME Frame Message Format

| Field | Length | Usage |
|---|---|---|
| Request L2ME Transaction Header | | |
| HDR_FMT | 8 bits | 0x9 |
| ENTRY_NODE_ID | 8 bits | The ID of the Entry node that requested the transaction; 0xFF=no Entry node |
| ENTRY_INDEX | 8 bits | Copied from initiating Submit; 0=no Entry node |
| WAVE_SEQ_N | 8 bits | An NC counter, which is held constant for all the L2ME Wave Cycles in an L2ME Wave, and is incremented when a new L2ME Wave starts; |
| VENDOR_ID | 16 bits | Copied from initiating Submit or NC node specified if ENTRY_NODE_ID=0xFF |
| TRANS_TYPE | 8 bits | Copied from initiating Submit or NC node specified if ENTRY_NODE_ID=0xFF |
| TRANS_SUBTYPE | 8 bits | Copied from initiating Submit or NC node specified if ENTRY_NODE_ID=0xFF |
| WAVE_NODEMASK | 32 bits | If TXN_WAVE_N=0 If there is an Entry node, copied from initiating Submit field WAVE0_NODEMASK |
| CYCLE_NODEMASK | 32 bits | The subset of WAVE_NODEMASK where the NC node is to receive a Response in this Wave Cycle; |
| WAVE_STATUS | 8 bits | Bits 7:3 reserved Type III<br>Bit 2: RESP_FAIL – 1 if response was not received from the requested node in previous Wave. This indicates to all nodes that this is the last L2ME Wave due to transaction failure; otherwise = 0<br>Bit 1: reserved Type III<br>Bit 0: FINAL_SUCCESS – 1 if the NC node declare this Wave as the last Wave with no errors; otherwise = 0 |
| DIR_LEN | 8 bits | 0x10 - If L2ME_PAYLOAD field has payload type "concatenated"; otherwise 0x0 |
| TXN_SEQ_N | 8 bits | A transaction sequence number, which is held constant for all the L2ME Waves in an L2ME transaction, and is incremented by the NC node when by a new L2ME transaction starts |
| TXN_WAVE_N | 8 bits | Wave number within the L2ME transaction, starting with 0 for initial Wave, and incremented by 1 for each subsequent Wave. |
| L2ME Transaction Payload | | |
| L2ME_PAYLOAD | 0-N bytes | One of four different payload types described below. |

In this message, the ENTRY_NODE_ID is copied from the initiating SUBMIT message. If the Request message results from an L2ME transaction without an EN, such as an NC management transaction, then the ENTRY_NODE_TXN_ID has no meaning and the field value is reset to "0". The WAVE_NODEMASK value is identical to the Submit message if this is the first L2ME Wave. In the last L2ME Wave in the transaction, the value of this field contains the set of nodes that are to be part of the last Wave. Otherwise, the WAVE_NODEMASK value corresponds to the set of nodes that provided a Response in the IN_NEXT_WAVE bit of the previous Request. The CYCLE_NODEMASK is the bitmask of the nodes where each bit position corresponds to the node ID (i.e., bit 0 value corresponds to node ID=0). The bit corresponding to each node is set if the node is instructed by the NC node to provide a Response upon receiving the Request message. In addition, the Request message includes the WAVE_STATUS field, which indicates if the previous Wave Cycle failed or completed successfully. Note that the allowed values in the WAVE_STATUS field are 0, 1, 2 and 4, and if the RESP_FAIL and/or NC_CANCEL_FAIL bits are set, this is the last L2ME Wave of the transaction and any following Wave may contain the L2ME_PAYLOAD field of the failed transaction.

The payload of the Response frame for the L2ME Waves (except for Wave 0) is typically formed by concatenating the Responses from the nodes in the previous wave. The concatenation is formed as follows: when a Response L2ME Frame arrives at the NC node from a given node, its payload is appended onto the end of a Response queue at the NC node. Then, the length of the payload is written into a data structure, called a directory, and the node's ID is transmitted. When the NC node is ready to send the next Request L2ME Frame, it places the length of the directory into a DIR_LEN field, copies the directory into the beginning of the payload and then copies the Response queue into the remainder of the payload.

The DIR_LEN field indicates the length of a directory in the payload portion of the Request L2ME Frame message. There are four different types of L2ME_PAYLOAD fields that are used in a Request L2ME Frame message, which are as follows:

1. The first type of L2ME_PAYLOAD is identical to the payload of the Submit message if it is the first L2ME Wave of a given transaction. The length of this L2ME_PAYLOAD field may be less than or equal to L_SUB_MAX, which is the maximum number of bytes in the concatenated Submit L2ME Frame payload.
2. The second type of Request L2ME Frame payload is sent as a report from the NC node to the participating client nodes starting from the second through the final Wave of the transaction as shown in Table 3 below. The L2ME_PAYLOAD field comprises a 16-entry directory with a 2 byte entry from each node, and a RESP_DATA field, which is a concatenation of the variable-length Response L2ME Frame from each of the participating L2ME nodes that provided a Response in the previous Wave. This directory enables the receiving node to decode the L2ME Responses from all the nodes.

TABLE 3

Request "Concatenated" L2ME Frame Payload Format

| Field | Length | Usage |
|---|---|---|
| Request L2ME Frame Concatenated Payload | | |
| For (i=0; i<N; i++) { | | N=DIR_LEN |
| DIR_NODE_ID | 8 bits | Node ID that sent Response i or 0xFF if directory entry i and subsequent directory entries are unused |
| DIR_RESP_INFO | 8 bits | Values [0...(L_RESP_MAX)] indicate the length of the payload in the Response from DIR_NODE_ID in units of 4 byte words. The following values have special meanings and indicate zero length: UNRECOGNIZED=0xFF - the node's Response header indicated it couldn't interpret the previous Request OVERFLOW=0xFE - the node's Response could not be included given L_REQ_MAX. |
| } | | |
| RESP_DATA | 0-N words | An integral number of variable length Response payloads, parsable by traversing lengths interpreted from the directory. |

3. The third type of L2ME_PAYLOAD is in the case of a failed L2ME transaction where the RESP_FAIL bit or NC_FAIL bit is set to "1". The NC node may transmit a zero-length payload in the Request message of the final L2ME Wave.
4. The fourth type of L2ME_PAYLOAD is used to support some specific L2ME transactions such as parameterized Quality of Service. In these cases, the DIR_LEN in the Request L2ME Frame header is not used, and the NC node process the Responses of all the nodes to produce a custom Request Frame payload. The format of the L2ME_PAYLOAD field is defined in the specific L2ME transaction. Note that Request Frames with no payload consist of a 64 bit Type III reserved field.

Response L2ME Message Format

The Response L2ME Frame format is shown in Table 4 below. Response L2ME Frames are sent unicast from each L2ME transaction capable node to the NC node at the end of each L2ME Wave. In some embodiments, the NC node may be configured to simultaneously receive multiple (e.g., three or more) Responses from the requested nodes.

TABLE 4

Response L2ME Frame Format

| Field | Length | Usage |
|---|---|---|
| Response L2ME Transaction Header | | |
| HDR_FMT | 8 bits | 0xA |
| RESP_STATUS | 8 bit | Bits 7:4 - reserved Type III Bit 3: DO_ENTRY_CANCEL=1 iff the Entry node requires during Wave 0 that the NC node not to issue further Waves in the transaction Bit 2: IN_NEXT_WAVE=1 iff the node will be included in WAVE_NODEMASK in the next Wave Bit 1: reserved Type III Bit 0: INTERPRETED=1 if the node fully recognized the Request message |
| RESERVED | 8 bits | Type III |
| WAVE_SEQ_N | 8 bits | Copied from initiating Request |
| RESERVED | 32 bits | Type III |
| L2ME Transaction Response Payload (Optional) | | |
| L2ME_PAYLOAD | 0-N words | The length is less than or equal to L_RESP_MAX; no payload in the Response if this is the final Wave of the transaction; divisible evenly by 4 |

The Response L2ME message includes a RESP_STATUS field, which indicates the response status of a node that was requested to respond in the next or final Wave Cycle. In addition, the RESP_STATUS field allows an EN to cancel a transaction it initiated by sending a Submit message to the NC node, but timed out waiting for the Response message.

If an L2ME enabled network node receives any L2ME transaction messages with an unrecognized VENDOR_ID, TRANS_TYPE, or TRANS_SUBTYPE field value, the node may set the RESP_STATUS field to "0" in the Response Frame and the NC node may preclude this node from future Waves in the transaction. The EN and any node that sets the IN_FINAL_WAVE bit in any Response may be included in the WAVE_NODEMASK of the final Wave.

L2ME Transaction Overview

L2ME transactions may be initiated in multiple ways, although usually only one L2ME transaction may be carried out at any given time within a network. In one embodiment, an L2ME transaction may be initiated by an EN, which may be any node connected to the network. For example, the EN may be a MoCA network node connected to a computer. The computer may be attached to the Internet and running an application that communicates by way of a higher layer protocol interface. In this configuration, the computer may use the EN as a proxy to monitor the entire MoCA network through L2ME messaging in response to application-generated operations within the computer.

Figure 4:
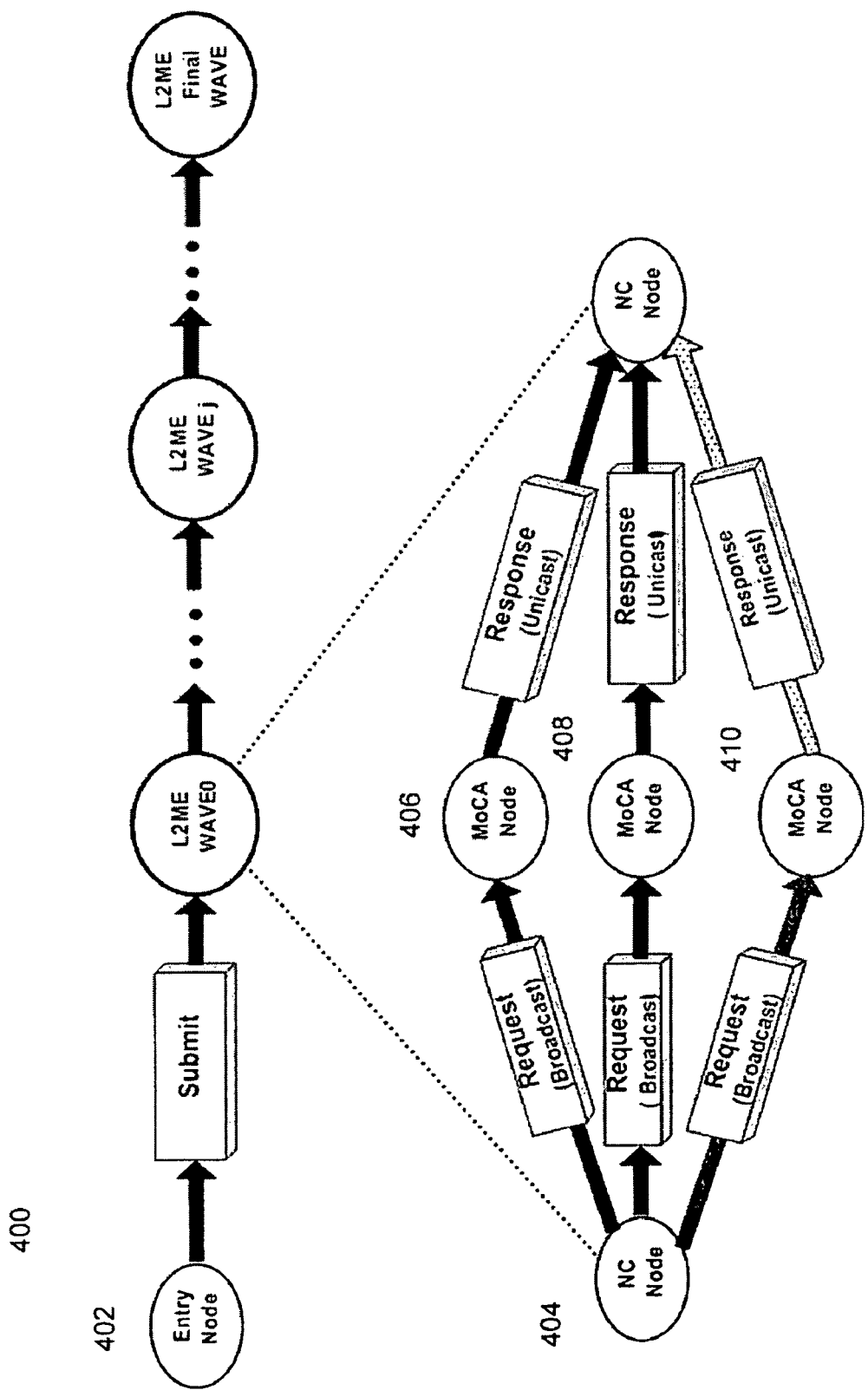
FIG. 4 is a block diagram of a Layer 2 Management Entity transaction protocol in accordance with one embodiment.

With reference to FIG. 4, one example of an EN-initiated transaction is now described. FIG. 4 illustrates a block diagram of one example of an L2ME transaction 400 initiated by EN 402. Upon receiving a request from an upper-level application, EN 402 generates and transmits a Submit L2ME message to NC node 404. NC node 404 receives the Submit message and initiates a first L2ME Wave, L2ME Wave 0, by broadcasting a Request message with a similar header to the Submit message received from EN 402. The Request message is broadcast to each of the L2ME capable nodes 406, 408, 410 specified by the WAVE_NODEMASK parameter contained in the payload. If this Request is sent to a node which is not L2ME capable, the node would simply ignore this message.

The Request L2ME Frame message is also sent to EN 402 for reasons now described. Upon receiving the Request message, EN 402 verifies the transaction by comparing the appropriate field in the Request header with values it used in the Submit header. If the values match, the transaction will be processed. However, there may be some instances when the L2ME transaction in the network is not the most recent transaction requested by EN 402. This situation arises when the Submit message transmitted by EN 402 was either corrupted, not received, or not granted by the NC node 404. If the initiated transaction is not the most recently requested L2ME transaction, EN 402 may cancel the transaction by setting the DO_ENTRY_CANCEL bit to "1" in the Response. Upon receiving a Response from EN 402 with the DO_ENTRY_CANCEL bit set to "1", the NC node does not issue more L2ME Waves in this transaction, but may immediately initiate another L2ME transaction.

Assuming the L2ME transaction is not canceled by EN 402, the requested L2ME transaction-capable nodes send a Response message to NC node 404 with a payload indicating whether or not they are opting to participate in the next Wave(s) of this transaction. A node may opt not to participate in future Waves if, for example, the transaction is a parameterized QoS transaction to create a new pQoS flow and the node cannot support the pQoS flow. A node may opt to participate in the network transaction by setting the IN_NEXT_WAVE bit to "1" and may opt to not participate by setting the IN_NEXT_WAVE bit to "0". In the following L2ME Waves, NC node 404 typically generates the Request L2ME Frame payload by concatenating all Responses from the previous Wave as described above. The NC node 404 then sends this Request message to the client nodes that requested participation in the current Wave. Note that for some transaction embodiments, the NC node may produce a distinct, non-concatenated Request message payload from the received Response payloads. The transaction continues until the NC node reaches the maximum number of Waves specified in the Submit L2ME message. Upon reaching the maximum number of Waves in the transaction, NC node 404 issues the final Wave, which comprises a Request L2ME Frame message to the EN 402.

However, if NC node 404 receives Responses from all of the L2ME capable nodes with the IN_NEXT_WAVE bit set to "0" and there is an EN, then NC node 404 may skip intermediate Waves in the transaction and synthesize an appropriate Request payload. If the REQUEST payload would have been created using concatenation, then NC node 404 fills the directory with DIR_NODE_ID=0xFF in all of the entries and the synthesized Request may have the TXN_WAVE N properly set for the final wave.

In a number of L2ME transactions, NC node 404 may request only EN 402 to provide a Response to its Request message after all other client nodes have responded. This Response, which completes the L2ME Wave in various transactions, ensures that the L2ME transaction has been fully completed before EN 402 notifies its application that the operation has completed. In other L2ME transactions, the transaction is not completed until NC node 404 sends a Request to multiple nodes, including EN 402, and receives a Response from each of the nodes.

In some instances, an entire L2ME transaction may result in an error. This situation arises if, for example, (1) an L2ME Wave Cycle fails; (2) the number of executed L2ME Waves in a given transaction is less than the expected total number of L2ME Waves as indicated in the TXN_LAST_WAVE_NUM field in the initiating Submit L2ME message; and (3) the L2ME transaction was initiated by an EN. In one embodiment, if an L2ME transaction fails, NC node 404 issues a new L2ME Wave called a transaction-failed Wave. This Wave announces the termination of the transaction due to the failure of the previous L2ME Wave. The transaction-failed Wave is initiated by NC node 404 sending a Request L2ME Frame header, as defined in Table 2 above, with the WAVE_STATUS field set to "4" and the WAVE_NODEMASK having the bit corresponding to EN 402 set to "1". Additionally, the Request L2ME Frame is a zero-length payload as described above. Upon receipt of this Request, EN 402 sends a Response L2ME Frame as shown in Table 4 above.

In another embodiment, NC node 404 may autonomously initiate an L2ME transaction to inform the client nodes in the network which other nodes are L2ME transaction-capable. These NC node initiated transactions are usually conducted in a single Wave and are designed to achieve network maintenance by providing interoperability with legacy or other compatible nodes. L2ME Wave operations initiated by the NC node usually have the following characteristics:

1. In order to bound the Wave duration, the NC node should include at least three nodes in the CYCLE_NODE-MASK field;
2. If the NC node does not receive the expected Response from the requested node within NC_TIMEOUT, the NC node assumes that the Response is no longer outstanding;
3. The NC node may not request a node to re-transmit its response before all the other nodes have been asked to first send their Responses; and
4. Any node that fails to provide a Response, when requested, within T21 of the second Request causes an L2ME Wave failure.

The WAVE_NODEMASK field indicates the set of client nodes that are recognized by the NC node as an L2ME transaction-enabled node. If the node is recognized by the NC node, then it responds using a zero-length Response message to complete the transaction using the Response L2ME Frame format in accordance with Table 5 below.

TABLE 5

| Response L2ME-Enabled Frame Format | | |
|---|---|---|
| Field | Length | Description |
| Response L2ME Header | | |
| HDR_FMT | 8 bits | |
| RESP_STATUS | 8 bits | Ignored by receiving node |
| RESERVED | 8 bits | Type III |
| WAVE_SEQ_N | 8 bits | Copied from initiating Request |
| RESERVED | 32 bits | Type III |
| Response L2ME Payload | | |
| RESERVED | 32 bits | 0; Type III |

In addition to the above described embodiments, the present disclosed method and apparatus may be embodied in the form of computer-implemented processes and apparatus for practicing those processes. The present disclosed method and apparatus may also be embodied in the form of computer program code embodied in tangible media, such as floppy diskettes, read only memories (ROMs), CD-ROMs, hard drives, "ZIP™" high density disk drives, DVD-ROMs, flash memory drives, or any other computer-readable storage medium, wherein, when the computer program code is loaded into and executed by a computer, the computer becomes an apparatus for practicing the disclosed method and apparatus. The present disclosed method and apparatus may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the disclosed method and apparatus. When implemented on a general-purpose processor, the computer program code segments configure the processor to create specific logic circuits.

Although the method and apparatus have been described in terms of embodiments that serve as examples, it is not limited thereto. Rather, the appended claims should be construed broadly, to include other variants and embodiments of the disclosed method and apparatus, which may be made by those skilled in the art without departing from the scope and range of equivalents of the disclosed method and apparatus.

What is claimed is:

1. A communications method comprising the steps of:
performing at least one Layer 2 transaction comprising a plurality of wave cycles, each Layer 2 transaction includes:
performing a first wave cycle comprising:
broadcasting a first request from a network coordinator to a plurality of nodes connected to a coordinated network, and
receiving a first response from one or more of the nodes indicating that the nodes have opted to participate in a next subsequent wave cycle,
concatenating the received first responses from each of the one or more nodes;
performing a second wave cycle comprising:
transmitting a subsequent request from the network coordinator to each of the one or more nodes based upon the concatenated first responses.

2. The communications method of claim 1, wherein the second wave cycle further includes receiving a subsequent response from each participating node.

3. The communications method of claim 1, wherein the step of performing at least one Layer 2 transaction is performed in response to receiving an initial request by the network coordinator from an entry node.

4. The communications method of claim 1, wherein the network transaction is a parameterized Quality of Service transaction.

5. The method of claim 1, wherein the first response receiving step comprises receiving the first response from a first sub-set of the plurality of nodes that have opted to participate in the next wave cycle, the method further comprising:
receiving a second response from a second sub-set of the plurality of nodes, wherein the second response indicates that the second sub-set of nodes has opted not to participate in the next wave cycle.

6. The communications method of claim 3, wherein the step of performing at least one Layer 2 transaction further includes the step of:
performing a third wave cycle wherein the network coordinator transmits a unicast message to at least one of the one or more nodes from which a response was not received by the network coordinator during the first wave cycle.

7. The communications method of claim 6, wherein the step of performing a third wave cycle further includes receiving a response to the unicast message from the at least one of the one or more nodes.

8. The communications method of claim 1, wherein the coordinated network is a mesh network.

9. The communications method of claim 1, wherein the coordinated network is a coaxial network.

10. The communications method of claim 1, wherein each cycle includes a request and a response from at least one or mode nodes.

11. The communications method of claim 1, wherein each of the requests and responses comprises at least one L2ME frame.

12. The communications method of claim 11, wherein each of the L2ME frames includes an L2ME header and an L2ME payload.

13. The communications method of claim 11, wherein the L2ME header and frames are included in a payload of a layer 2 frame.

14. The communications method of claim 1, wherein the Layer 2 transaction is managed by an L2ME having an upper Layer 2 transaction protocol module and a lower Layer 2 wave protocol module.

15. A system, comprising:
a physical interface connected to a shared medium, the physical interface configured to transmit and receive signals through the shared medium;
an L2ME connected to the physical interface and configured to manage a plurality of transactions with at least one node connected to the shared medium, the L2ME having:
a lower module configured to perform a plurality of wave cycles; and
an upper module configured to facilitate the plurality of transactions using the plurality of wave cycles performed by the lower module;
wherein the plurality of wave cycles includes a first wave cycle in which a first request is broadcast to a plurality of nodes, and in which a first response is received from one or more of the nodes indicating that the nodes have opted to participate in a next subsequent wave cycle, the first wave cycle further including concatenating the received first responses from each of the one or more nodes; and
wherein the plurality of wave cycles also includes a second wave cycle in which a subsequent request is transmitted to each of the one or more nodes based upon the concatenated first responses.

16. The system of claim 15, wherein the shared medium is a coaxial network.

17. The system of claim 15, wherein the shared medium is a mesh network.

18. The system of claim 15, wherein the shared medium is a wireless network.

19. A non-transitory machine readable medium encoded with program code, wherein when the program code is executed by a processor, the processor performs a communications method comprising the steps of:
performing at least one Layer 2 transaction comprising a plurality of wave cycles, each Layer 2 transaction including:
performing a first wave cycle comprising:
broadcasting a first request from a network coordinator to a plurality of nodes connected to a coordinated network, and
receiving a first response from one or more of the nodes indicating that the nodes have opted to participate in a next subsequent wave cycle,
concatenating the received first responses from each of the one or more nodes;
performing a second wave cycle comprising:
transmitting a subsequent request from the network coordinator to each of the one or more nodes based upon the concatenated first responses.

20. The machine readable medium of claim 19, wherein the coordinated network is a coaxial network.

21. The machine readable medium of claim 19, wherein the second wave cycle further includes receiving a subsequent response from each participating node.

22. The machine readable medium of claim 19, wherein the step of performing at least one Layer 2 transaction is in response to receiving an initial request at the network coordinator from an entry node.

23. The machine readable medium of claim 19, wherein the step of performing at least one Layer 2 transaction further includes the step of:

performing a third wave cycle wherein the network coordinator transmits a unicast message to at least one or more nodes that failed to respond during the first wave cycle.

24. The machine readable medium of claim 23, wherein the step of performing a third wave cycle further includes receiving a response to the unicast message from at least one of the one or more nodes.

25. The machine readable medium of claim 19, wherein the first response receiving step comprises:

receiving the first response from a first sub-set of the plurality of nodes that have opted to participate in the next wave cycle, and receiving a second response from a second sub-set of the plurality of nodes, wherein the second response indicates that the second sub-set of nodes has opted not to participate in the next wave cycle.

* * * * *